(12) United States Patent
Fulk, II et al.

(10) Patent No.: US 11,254,551 B2
(45) Date of Patent: Feb. 22, 2022

(54) APPARATUS AND METHOD FOR PLACING AND TENSIONING AN AERIAL, ROPE THROUGH A TRAVELER OF A POWER LINE

(71) Applicant: Quanta Associates, L.P., Houston, TX (US)

(72) Inventors: James Alan Fulk, II, Chattanooga, TN (US); David Wendell Lapham, Chattanooga, TN (US); Timothy Dean Nutz, Chattanooga, TN (US)

(73) Assignee: Quanta Associates, L.P., Houston, TX (US)

( * ) Notice: Subject to any disclaimer, the term of this patent is extended or adjusted under 35 U.S.C. 154(b) by 43 days.

(21) Appl. No.: 16/248,610

(22) Filed: Jan. 15, 2019

(65) Prior Publication Data
US 2019/0218076 A1   Jul. 18, 2019

Related U.S. Application Data

(60) Provisional application No. 62/617,915, filed on Jan. 16, 2018.

(51) Int. Cl.
*B66D 1/42* (2006.01)
*B66D 1/38* (2006.01)
(Continued)

(52) U.S. Cl.
CPC .............. *B66D 1/42* (2013.01); *B64C 39/024* (2013.01); *B66D 1/38* (2013.01); *B66D 5/14* (2013.01); *H02G 1/04* (2013.01); *B64C 2201/12* (2013.01)

(58) Field of Classification Search
CPC ... B66D 1/42; B66D 1/38; B66D 1/12; B66D 1/36; B66D 1/50; B66D 5/14;
(Continued)

(56) References Cited

U.S. PATENT DOCUMENTS

| 3,030,075 A | * | 4/1962 | Kocalis | H02G 1/04 |
| | | | | 254/134.3 R |
| 3,650,492 A | * | 3/1972 | Stum | A01K 3/00 |
| | | | | 242/390 |

(Continued)

OTHER PUBLICATIONS

Benedict, Tyler, TRP Showing New Mechanical & Hybrid Hydraulic Disc Brake Calipers for Road Bikes, Bike Rumor!, Jan. 29, 2013, 8 pages, https://bikerumor.com/2013/01/29/trp-showing-new-mechanical-hybrid-hydraulic-disc-brake-calipers-for-road-bikes/.

*Primary Examiner* — Seahee Hong
(74) *Attorney, Agent, or Firm* — Oathout Law Firm; Mark A. Oathout; Laura Tu

(57) ABSTRACT

An apparatus for controlling tension in a pulling rope that is attached to a flying, unmanned aerial device or drone may utilize a cylinder around which the rope is wound, a shaft that longitudinally passes through the cylinder, a disc brake rotor that is mounted to the shaft, a brake caliper that is mounted circumferentially at a periphery of the disc brake rotor, and a brake lever that tensions a cable that is attached to, and movable to control movement of, the brake caliper, which may be hydraulic, against surfaces the disc brake rotor. The brake lever may be hand actuated and mounted to a handlebar. A frame may be part of the apparatus and support apparatus components and may have a protruding hitch portion that inserts into a vehicle's receiver hitch. An adjustable pulling rope guide support through which the rope is threaded, mounts to the frame.

13 Claims, 9 Drawing Sheets

(51) Int. Cl.
    *H02G 1/04*     (2006.01)
    *B64C 39/02*     (2006.01)
    *B66D 5/14*     (2006.01)

(58) Field of Classification Search
    CPC .... B64C 39/024; B64C 2201/12; H02G 1/04; B65H 49/18
    USPC .................................................. 254/134.3 R
    See application file for complete search history.

(56) References Cited

U.S. PATENT DOCUMENTS

| | | | | |
|---|---|---|---|---|
| 4,006,884 | A * | 2/1977 | Lederhos | H02G 1/04 254/134.3 PA |
| RE31,810 | E * | 1/1985 | Lee | A01F 25/18 100/100 |
| 6,276,503 | B1 * | 8/2001 | Laughlin, Jr. | B65H 75/403 191/12.2 A |
| 7,820,928 | B2 * | 10/2010 | Simon | H01H 9/0235 200/331 |
| 10,329,016 | B1 * | 6/2019 | Jackson | B64D 1/22 |
| 2018/0312211 | A1 * | 11/2018 | Logan | B62K 19/16 |

* cited by examiner

APPARATUS AND METHOD FOR PLACING AND TENSIONING AN AERIAL, ROPE THROUGH A TRAVELER OF A POWER LINE

STATEMENT REGARDING FEDERALLY SPONSORED RESEARCH OR DEVELOPMENT

None.

FIELD OF THE INVENTION(S)

This invention relates to an apparatus and a method of tensioning an aerial rope that is attached to an unmanned aerial device, such as a drone.

BACKGROUND OF THE INVENTION(S)

Installing new or replacement de-energized power line conductors may be performed using a variety of known equipment and known methods depending upon the terrain over which, or through which, the power line is to be built or rebuilt. Generally, installing a conductor into its position on a power line tower or other structure involves pulling a rope or cable that is attached to a conductor to be pulled into position. In one example, in the case relatively flat, or open and generally unobstructed Earth terrain, simply pulling a conductor into place using traditional ground-based, or ground-positioned pulling equipment is possible because moving and installing pulling equipment along a generally flat right-of-way beside power line towers is physically possible. Stringing a conductor, that is, pulling a conductor from one tower to an adjacent tower in a series, is done in segments called a "pull" or "pulls," which may range from a relatively short pull between two adjacent towers, to a conductor pull through multiple towers that are arranged for many miles or kilometers. The pull may begin by using a rope attached to a rotating drum, which is attached to and powered by a pulling machine. As the drum rotates, the rope is pulled through a traveler, also known as a pulley, from one tower to a traveler at an adjacent tower. The rope at the trailing end is then attached to the actual conductor, which are in many instances steel and aluminum. When on relatively flat terrain, placement of the rope into one or more of the travelers on towers may be accomplished by a lineman in a bucket of a bucket truck. The rope can then be pulled through the travelers, which then pulls the conductor through the travelers.

In another example, a traditional manned helicopter may be employed to lift one end of a rope to traverse over and above any topographical feature that is not possible to traverse with land vehicles such as bucket trucks. Examples of a topographical surface feature that may be impossible to traverse with land vehicles include a heavily forested area, a mountainside, a swamp, steep ravine, or a rocky ravine. Examples of bodies of water may be lakes, rivers, streams, marshes or other swampy areas upon which driving a truck or other wheeled equipment is not possible. However, one problem associated with using manned helicopters to traverse such topographical features as part of installing a conductor is the relatively high hourly or daily rate for employing a manned helicopter compared to utilizing only ground-based equipment. What makes the use of manned helicopters expensive is not only the high cost of the helicopter equipment itself, but the cost of an operator, equipment insurance, liability insurance, and the cost of local use permits. Also, the time to acquire or have a permit approved for manned helicopter use in a designated area is another disadvantage to an essentially ground-based, conductor stringing or pulling operation. Still yet, manned helicopters with turbo-jet or other combustion driven engines are relatively noisy to operate and may stress humans or wildlife within hearing distance of the operational area of a helicopter.

Thus, while previous apparatus and methods for pulling a rope attached to a conductor have been satisfactory for their intended purposes, a need exists in the art for an apparatus and methods that improve over that which is known.

SUMMARY

The present teachings may include an apparatus for controlling tension in a rope when the rope is attached to an unmanned aerial device that flies above a surface of the Earth, and may utilize a pulling rope reel including a cylinder around which the rope is wound, a shaft that longitudinally connects to or passes through the pulling rope reel or cylinder, a disc brake rotor that is mounted to the shaft, a brake caliper that is mounted circumferentially about a periphery of the disc brake rotor, and a brake lever that is movable to control movement of the brake caliper against the disc brake rotor. The apparatus may further utilize a control cable for controlling braking of the disc brake rotor, the control cable having a control cable first end and a control cable second end, the control cable first end attached to the brake lever, and the control cable second end attached to the brake caliper. The apparatus may further utilize a handlebar to which the brake lever, which may be a thumb lever, is mounted. The apparatus may further utilize a frame upon which the apparatus is mounted, and a protruding hitch portion that protrudes from the frame. The apparatus may further utilize a vehicle having a receiver tow hitch into which the protruding hitch portion inserts. The apparatus may further utilize a pulling rope guide through which the rope is threaded and a pulling rope guide support that is adjustable vertically and toward and away from the cylinder. A hinge or pivot may be used to adjust the pulling rope guide support.

In another example, an apparatus for tensioning a rope that is attached to an airborne unmanned aerial device may utilize a pulling rope reel including a cylinder around which the rope is wound, a shaft that longitudinally passes through the cylinder, a disc brake rotor that is mounted to the shaft, a brake caliper that is mounted circumferentially about a periphery of the disc brake rotor, a brake lever that is movable to control movement of the brake caliper against the disc brake rotor, and a protruding hitch portion that inserts to a vehicle receiver hitch for quickly connecting and disconnecting the apparatus for tensioning a rope. The apparatus may further utilize a control cable having a control cable first end attached to the brake lever, and a control cable second end attached to the brake caliper, a frame, such that the protruding hitch portion protrudes from the frame, a pulling rope guide mounted to a frame and through which the rope is threaded, and a hinge that permits adjustment of the pulling rope guide support.

In another example, a method of flying a rope may include positioning a vehicle next to a series of power line structures or towers, fastening a rope tensioning mechanism to the vehicle, pulling a rope from the rope tensioning mechanism, connecting the rope to an unmanned aerial device, releasing a brake of the unmanned aerial device, flying the unmanned aerial device away from the vehicle, unwinding the rope from a cylinder of the tensioning mechanism, and increasing braking force of the tensioning mechanism thereby increasing tension in the rope as the unmanned aerial device flies away from the vehicle. The method may further include disconnecting the rope from the unmanned aerial device, decreasing braking force of the tensioning mechanism, and rewinding the rope around a cylinder of the tensioning mechanism. Fastening a rope tensioning mechanism to the vehicle may further include inserting an insertion bar of the tensioning mechanism, or a frame of the tensioning mechanism, into a trailer hitch on the vehicle. Rewinding the rope around a cylinder of the tensioning mechanism may be accomplished using a hand crank, an electric drill, or an electric motor with a sufficient torque rating attached or mated to a shaft of the cylinder. Increasing braking force of the tensioning mechanism and decreasing braking force of the tensioning mechanism may further include moving a thumb lever to drive a disc brake caliper into and away from a disc brake rotor, respectively.

In another example, a method for installing a line such as a rope in a power line structure may include connecting the line to an unmanned aerial device proximate a ground surface, wherein the line is attached proximate one end to a pulling rope reel, flying the unmanned aerial device away from the ground surface and toward the power line structure, unwinding the line from the pulling rope reel via the unmanned aerial device, and installing the line on the power line structure by flying the unmanned aerial device.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to a detailed description of the present teachings with reference to FIGS. 1-9, features and concepts also may be manifested in other arrangements and so the scope of the teachings is not limited to the embodiments described or depicted in FIGS. 1-9. The following examples of certain embodiments of the teachings are provided. Each example is provided by way of explanation of the teachings, one of many examples of the teachings, and the following examples should not be read to limit, or define, the scope of the teachings.

Figure 1:
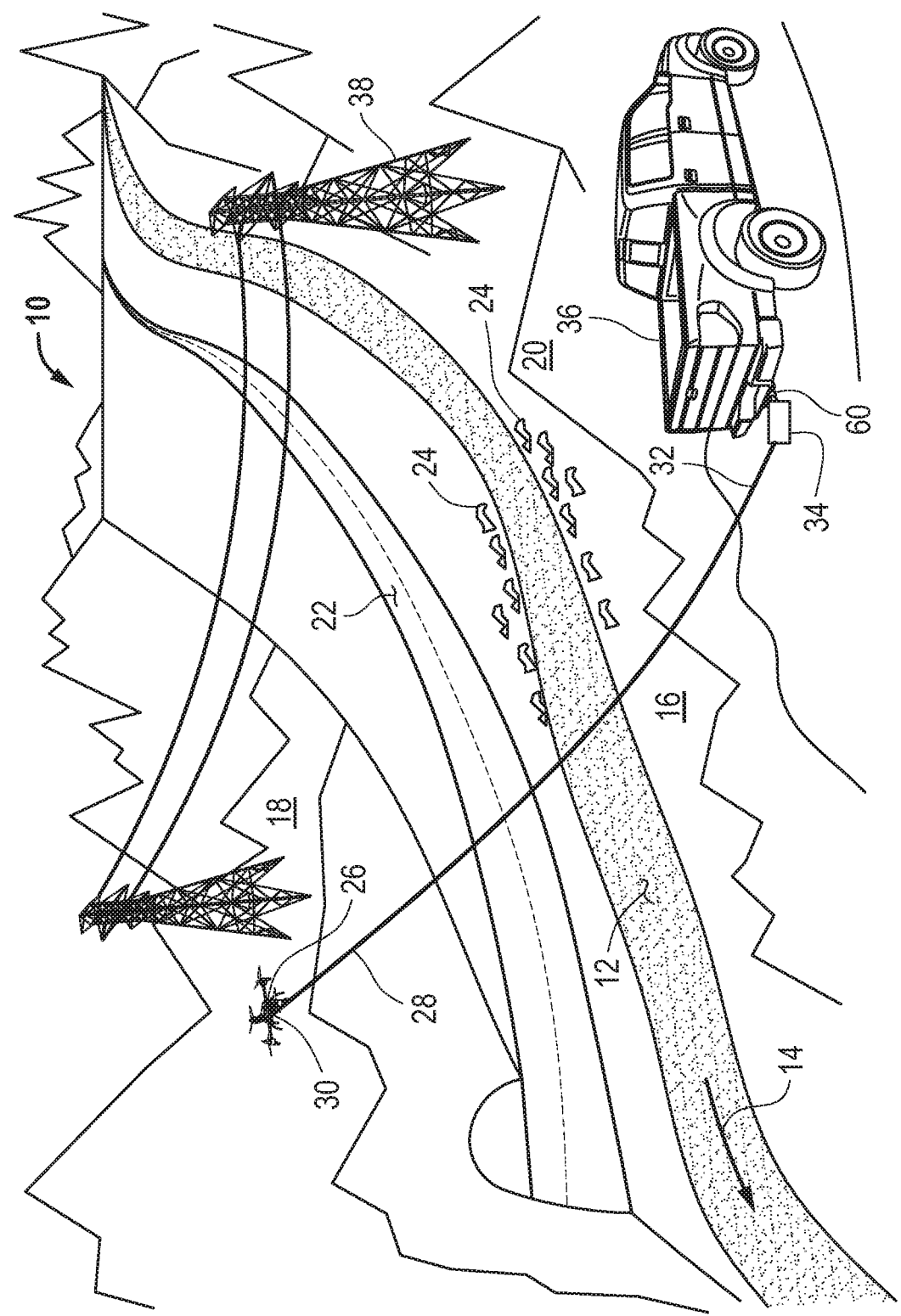
FIG. 1 is an aerial perspective view of an outdoor landscape depicting topographical features and an apparatus for aerially delivering a rope to a power line.

FIG. 1 depicts an example of an outdoor landscape 10 with geographical obstacles that must be considered when installing a new electrical conductor into or onto electrical power line towers, whether that conductor is part of new power line tower construction or a replacement conductor into an existing power line tower. For example, outdoor landscape 10 depicts a river 12 that flows in direction 14 through or within a valley 16. On each side of the valley 16, a mountain 18 and a mountain 20 may exist. Within river 12 or within valley 16, boulders 24 or other large rocks may exist and further present challenges when needing to install a conductor over, above and beyond such boulders 24, river 12, or valley 16. Next to river 12, a road 22 may exist. Any one of a river 12, valley 16, mountain 18, mountain 20, road 22, or boulder 24 may present itself as an individual challenge, but in many instances, more than one obstacle presents itself as a challenge to installing a new conductor, and thus traversing the surface of the Earth with a land vehicle is not practical or possible. Regarding the obstacles presented in FIG. 1, an unmanned aerial vehicle, also known as an UAV, or unmanned drone, or simply a drone 26 may be used as part of an overall apparatus and accompanying method to installing an electrical conductor thereby making it possible to bypass the topographical features and obstacles depicted in FIG. 1. Bypassing the obstacles identified in FIG. 1, by employing a drone 26 to move or pull a rope 28 and a conductor attached to the rope reduces time, effort, and expense, and creates a work environment that is safer for workers than using traditional helicopters. As depicted in FIG. 1, a drone 26 may be used to initially transport rope 28 between mountains 18, 20, such as from the surface of the Earth on one side of river 12 or valley 16 to the surface of the Earth on the opposite side of river 12 or valley 16. This process of using a drone to move a rope through the air, is being referred to in this description as "flying a rope" or "pulling a rope." A conductor may also be flown using the same or similar method.

Continuing with FIG. 1, a first end 30 of rope 28 may be attached to drone 26, while a second end 32 of rope 28 may be attached to a tensioning mechanism 34, which may be used to increase or decrease the force of tension in rope 28. Tensioning mechanism 34 may be securely attached to wheeled vehicle 36, but attached in such a way that tensioning mechanism 34 may be quickly detachable, that is, quickly released and separated from wheeled vehicle 36, such as in less than one minute, such as with a standard vehicle trailer towing hitch. Tensioning mechanism 34 is portable, and in at least one example, it can be manufactured from materials light enough so that it can be lifted and carried relatively easily by one person. Materials may include but are not limited to, thin-walled tubular steel, tubular aluminum, and carbon fiber. Wheeled vehicle 36 may be a car, pickup truck, a sport-utility vehicle (SUV), a towable trailer, all-terrain vehicle (ATV), or other mobile and easily positioned vehicle, whether or not such vehicle is capable of moving under its own power, or is towable behind a self-propelled vehicle. To be quickly attachable to, and quickly releasable from, any trailer or vehicle, such as wheeled vehicle 36, a standard tow hitch, such as a two inch (2" or 5.1 cm) tow hitch 60 (FIG. 3), may be utilized on wheeled vehicle 36 so that tensioning mechanism 34 can be relatively quickly, easily, and securely installed into the tow hitch 60, which is securely attached to wheeled vehicle 36, and quickly uninstalled from tow hitch 60. Although a standard two inch (2" or 5.1 cm) tow hitch may be used, other tow hitches or receiver hitch mechanisms may be used.

Figure 2:
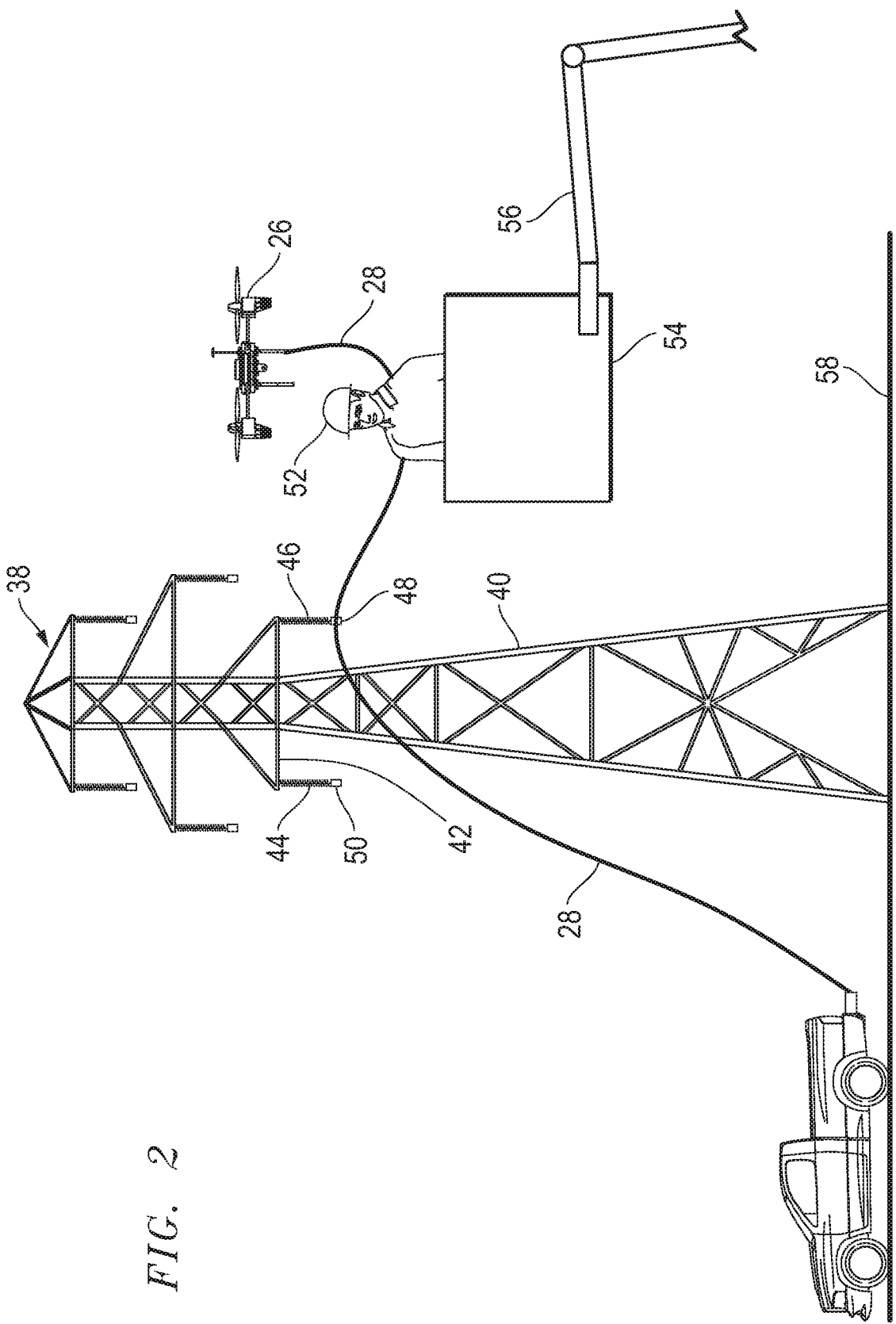
FIG. 2 is a perspective view of a unmanned aerial device flying a rope to a power line traveler, with the rope being tensioned by a portable tensioning mechanism.

FIG. 2 depicts an enlarged view of relative positions in one scenario of flying a rope 28 in the process of stringing or installing a new power line. FIG. 2 depicts a power line structure or tower 38, which may employ a vertical or substantially vertical tower support 40 and a cross arm 42, which is attached to vertical tower support 40. Insulator 44 and insulator 46 may be attached to cross arm 42, such as at opposite ends of cross arm 42 as depicted. For a pulling rope process, at the end of insulator 46 a traveler 48 may be utilized to support pulling rope 28 and eventually an electrical conductor, which will follow in the installation pulling process. At an end of insulator 44, another traveler 50 may reside to support another rope, and eventually an electrical conductor, during a pulling rope process. At the completion of a pulling rope process when conductors are successfully pulled into place, all travelers 48, 50 may be removed and replaced with a suspension shoe to securely and permanently support the installed conductors. During a pulling rope process, a line worker 52 may be lifted in a bucket 54 attached to a boom 56 of an aerial lift device, also known as a bucket truck (not shown) above a surface 58 of Earth, and line worker 52 may assist in the process by grabbing the pulling rope 28, which is being flown by drone 26, and hand-thread an end of pulling rope 28 into traveler 48, or otherwise completely hand-thread rope through traveler 48. As depicted in FIG. 2, one end of pulling rope 28 is attached to drone 26, and another end of pulling rope is attached to tensioning mechanism 34. Alternatively, line worker 52 may use an approved insulated device such as a hot-stick to properly manipulate and thus secure rope into a traveler. Alternatively, line worker 52 does not have to be present at traveler 48 to ensure that pulling rope 28 becomes securely within traveler 48, and instead drone 26 can be flown so that drone 26 itself pulls or guides pulling rope 28 into traveler 48 under sole power of drone 26, and manipulation and positioning of drone 26. The rotating traveler 48 facilitates installation of rope 28 before a new conductor subsequently can be pulled into place.

Figure 3:
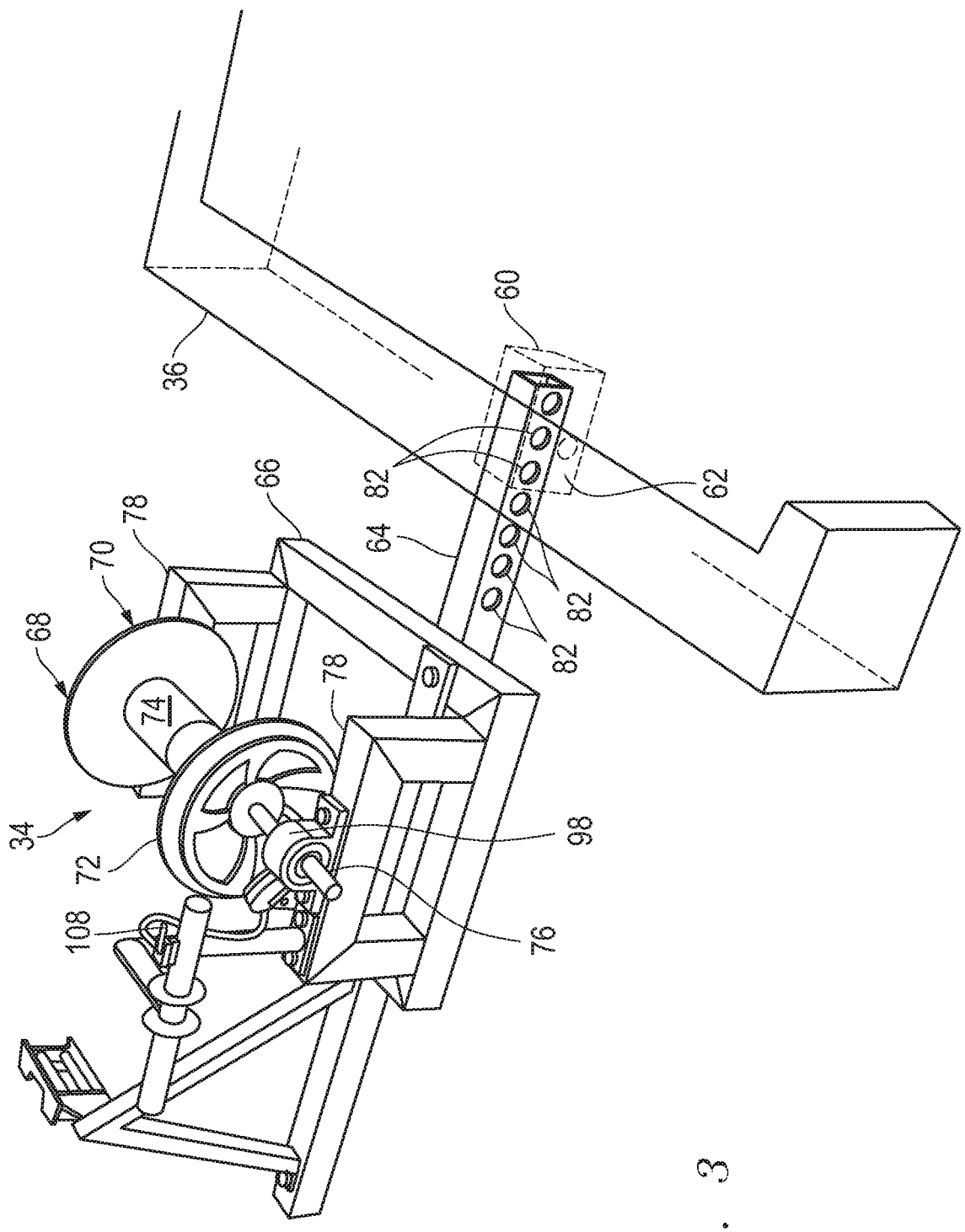
FIG. 3 is a perspective view of a portable rope tensioning mechanism attached to a tow hitch of a vehicle.
Figure 4:
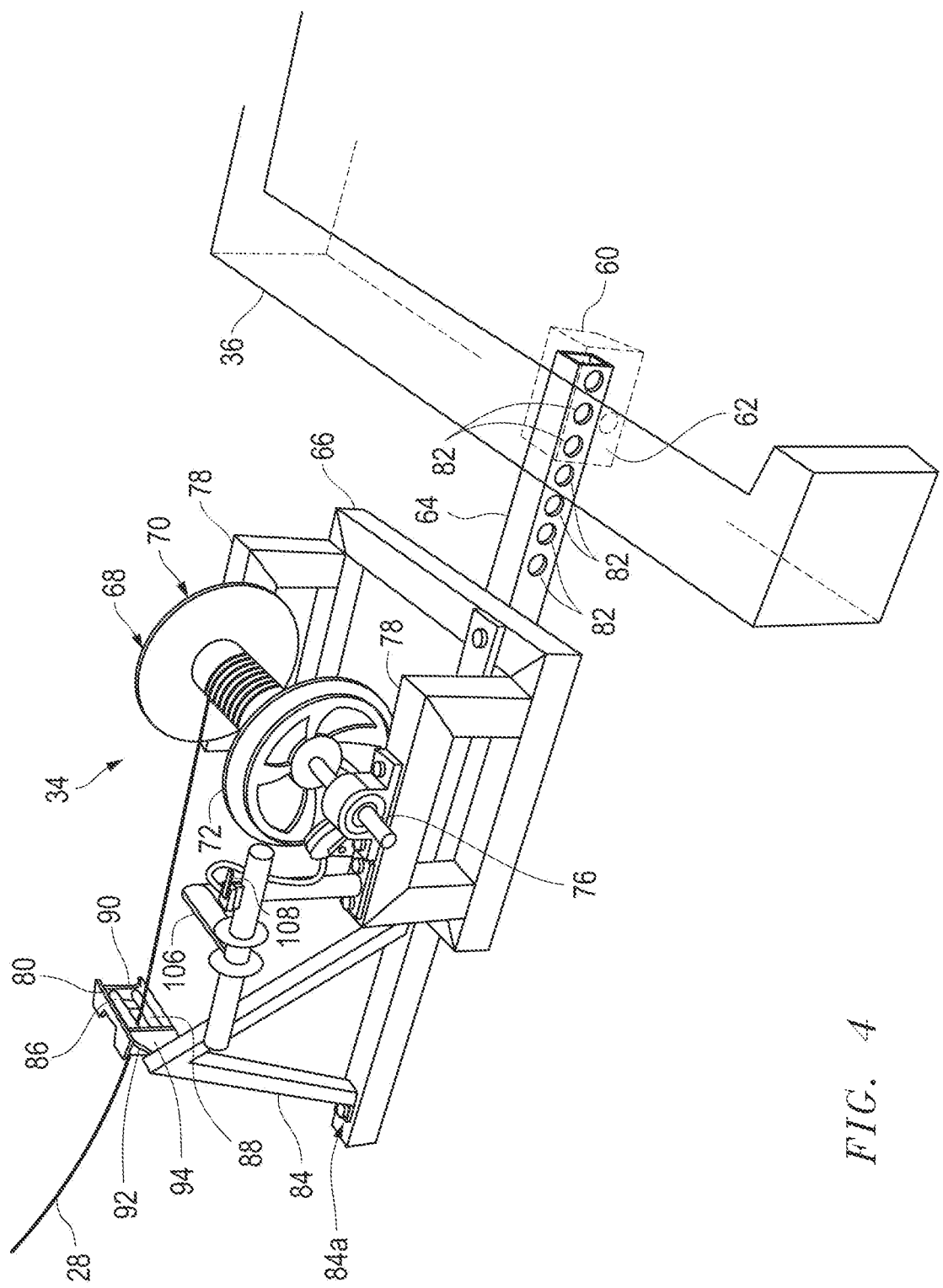
FIG. 4 is a perspective view of a portable rope tensioning mechanism attached to a tow hitch of a vehicle.

Turning now to FIG. 3, tensioning mechanism 34 will be explained in greater detail. Tensioning mechanism 34 is a handheld, portable unit that may be installed into, or attached to, any vehicle 36 with a tow hitch 60, such as under, or at, a rear end or front end of vehicle 36. Tow hitch 60 may define a hollow cavity 62 into which a smaller insertion bar 64 of tensioning mechanism 34 may be inserted. Insertion bar 64 of tensioning mechanism 34 may reside below or may be an integral, planar extending portion of a base frame 66 upon which a pulling rope reel 68 may reside. Pulling rope reel 68 may employ a first reel side wall 70 and a second reel side wall 72, which may reside on opposite sides of a cylinder 74, upon which and around which pulling rope 28 may be wound, such as before, during, and after a rope pull. Tensioning mechanism 34 may also employ a shaft 76 which may reside concentrically inside of, and extend outwardly from each longitudinal end of, cylinder 74. Shaft 76 is concentric with cylinder 74, and each end of shaft 76 may reside within, and may pass through, a journal bearing 98. Each journal bearing 98 may be fastened to and reside directly upon a reel support frame 78, which may be directly attached to base frame 66. With reference to FIG. 4, insertion bar 64 may be an elongate tubular member that passes completely under base frame 66 and beyond an outer perimeter of base frame 66 on an opposite side as a tow hitch 60 to provide support for a pulling rope roller guide 80. Insertion bar 64 may be straight and may be a single, tubular member.

FIG. 4 depicts a view of tensioning mechanism 34 having rope 28 wound around its cylinder 74 and passing through pulling rope roller guide or pulling rope guide 80, and with insertion bar 64 inserted into tow hitch 60 of vehicle 36. Insertion bar 64 may have a series of thru holes 82 to permit adjustment and alignment of a hole of insertion bar 64 with a hole through facing sides of tow hitch 60. Different thru holes 82 of insertion bar 64 may be utilized within tow hitch 60, as required or desired, depending upon the type of vehicle, or terrain upon which tensioning mechanism 34, is positioned for use. Insertion bar 64 may have mounted to it, either directly or indirectly, the pulling rope roller guide 80 thru which rope 28 may pass. Pulling rope roller guide 80 is in place to assist with guiding and protecting pulling rope 28 while one end of rope 28 is attached to drone 26, and the other end is wound around cylinder 74. Pulling rope roller guide 80 may include or employ a top roller 86, a bottom roller 88, a first side roller 90, and a second side roller 92. When in use, pulling rope 28 may contact any of top roller 86, bottom roller 88, first side roller 90, and second side roller 92, of roller guide 80, as necessary depending upon positioning of tensioning mechanism 34 within tow hitch 60, and the overhead, in-flight position of drone 26 while in flight. During flight of drone 26 during a pulling rope process, pulling rope 28 will not be affected in terms of its strength or surface integrity due to the smooth, cylindrical surfaces of all rollers, and the ability of all rollers of roller guide 80 to roll about each roller's own longitudinal axis. A roller guide support or pulling rope guide support 84 may be attached directly to insertion bar 64 and roller guide 80, and roller guide support 84 may pivot via a hinge or pivot 84a relative to insertion bar 64. Alternatively, roller guide 80 may be indirectly attached to insertion bar 64, such as with an intermediary support, such as a bar or support plate 94, as depicted in at least FIG. 4.

Figure 5:
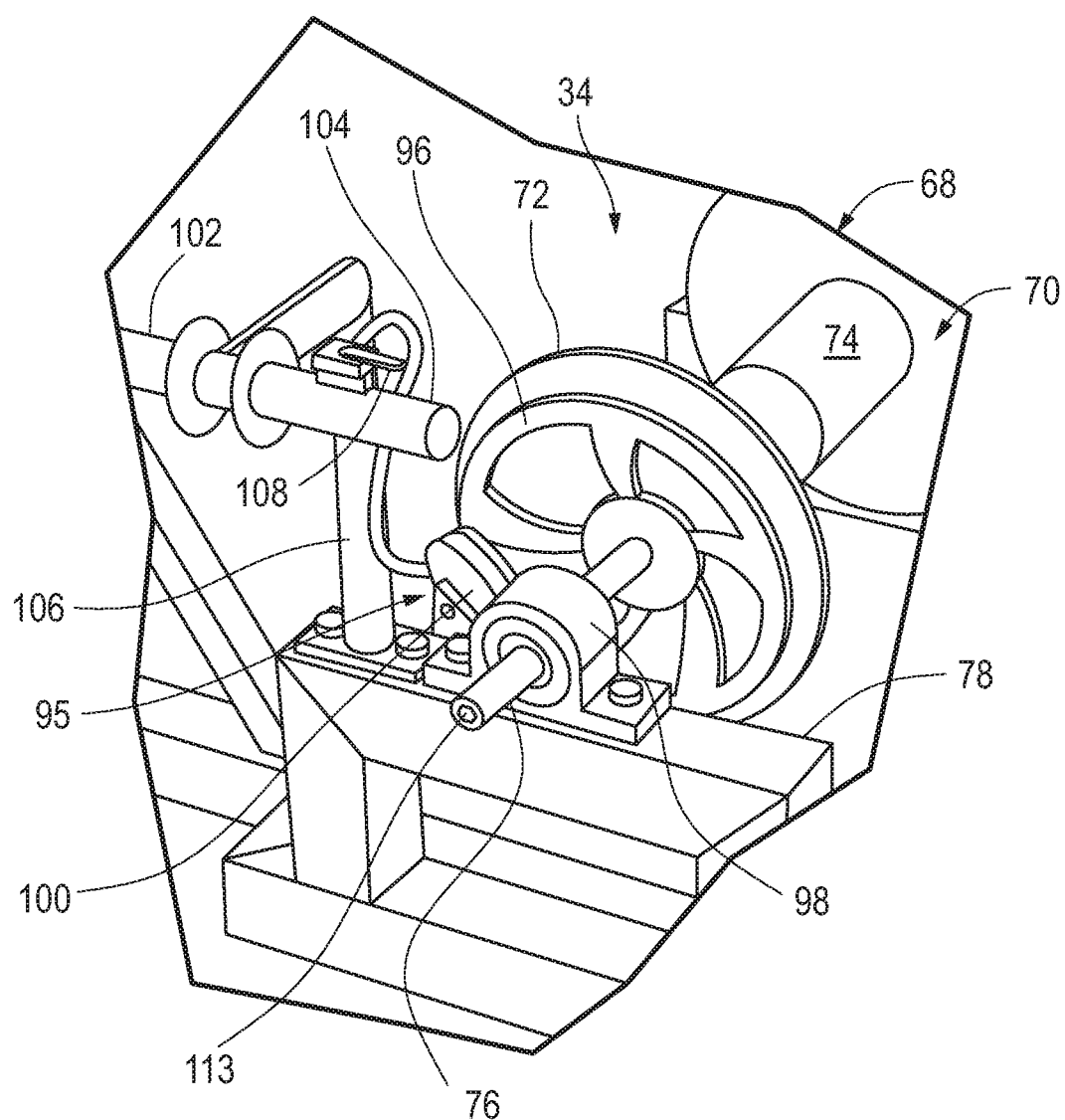
FIG. 5 is a perspective view of a portable rope tensioning mechanism attached to a tow hitch of a vehicle.
Figure 6:
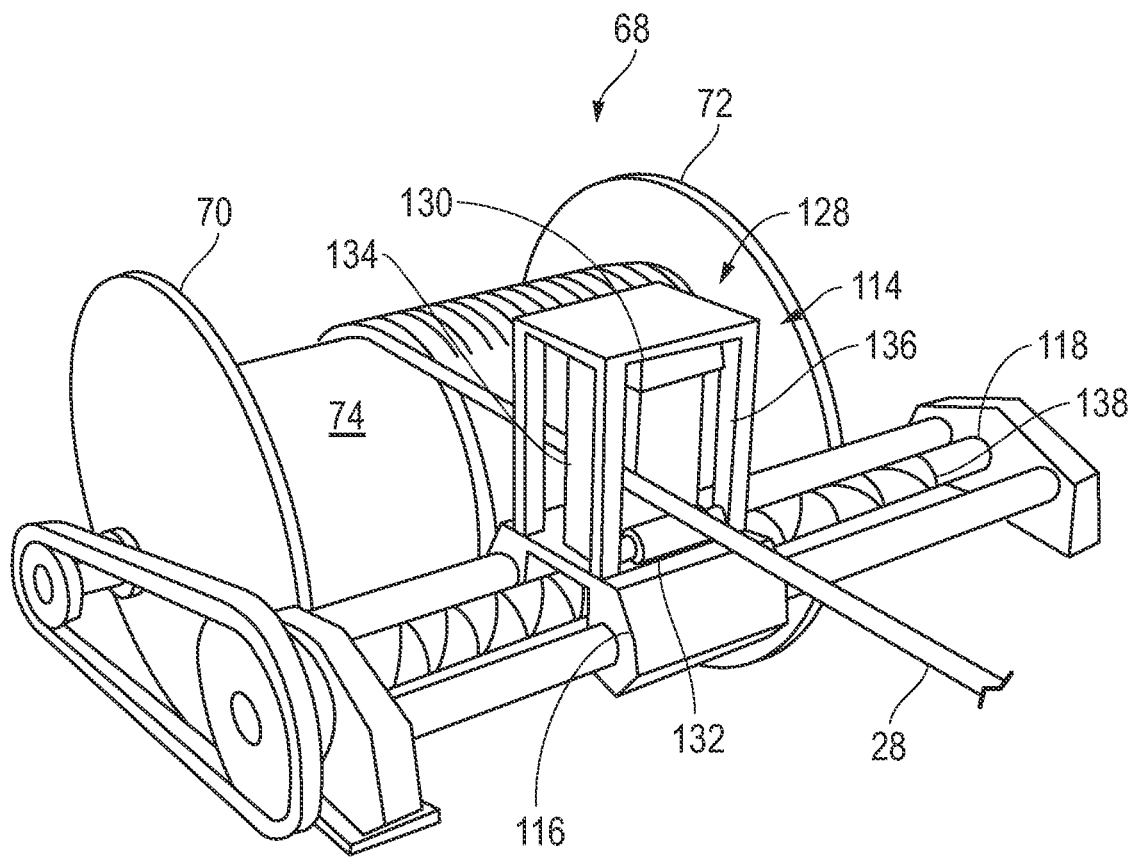
FIG. 6 is a perspective view of a mechanical level winder positioned to facilitate winding and unwinding of a rope on a cylinder of a tensioning mechanism.

FIG. 5 depicts part details that permit tensioning mechanism 34 to adjust and affect the tension of and in rope 28 when rope 28 is attached to a drone 26 that is flying through the air, the process of which is referred to as "flying a rope." Tensioning mechanism 34 may employ a braking mechanism 95. The braking mechanism 95 is mounted proximate or optionally on the pulling rope reel 68 (in a position to effect e.g. the cylinder 74, first reel side wall 70 and/or second reel side wall 72, shaft 76, and/or even brake the motor 300a/b or its drive shaft). In one exemplary embodiment the braking mechanism 95 may be in the form as follows. A disc brake rotor 96 that is attached to shaft 76 and that rotates with shaft 76 as rope 28 is unwound from or wound onto cylinder 74. Disc brake rotor 96 may be located between reel side wall 72 and journal bearing 98, with shaft 76 passing through both. A left handle grip 102 and a right handle grip 104 may be attached to a handle grip post 106. A disc brake caliper 100 may straddle, or otherwise reside around disc brake rotor 96, such as above flat surfaces of disc brake rotor 96, and may be activated to slow or stop cylinder 74 by a user who moves a thumb lever 108. By way of example only, disc brake caliper 100 may be mounted about a partial circumference of a periphery of the disc brake rotor 96. Thumb lever 108 is more generally known as a brake lever. A mechanical cable 110 is attached to thumb lever 108, and when thumb lever 108 is moved in a first direction (e.g. clockwise), the cable will cause disc brake caliper 100 to close upon and contact the disc brake rotor 96 with increasing contact force until cylinder 74 is halted, if desired. Thumb lever 108, cable 110, disc brake caliper 100, and disc brake rotor 96 can together be thought of as a hand brake. The hand brake is operable or actuated with a human hand. Alternatively, just a human thumb, or thumb and index finger can be used to operate or actuate the hand brake, that is, move thumb lever 108 so that disc brake caliper 100 moves away from or toward disc brake rotor 96. Even the palm, that is, the heel of a human palm, of a human operator's hand can be used to operate thumb lever 108. When thumb lever 108 is moved in a second direction (e.g. counterclockwise), the cable will cause disc brake caliper 100 to contact disc brake rotor 96 with decreasing contact force until there is no contact force on disc brake rotor 96, and cylinder 74 is free spin or rotate. With no force from disc brake caliper 100 upon disc brake rotor 96, disc brake rotor 96 and cylinder 74 are free to rotate about shaft 76 so that rope 28 can unwind, or be rewound, with relatively little force. For unwinding, rope 28 may be pulled by drone 26, and for rewinding, rope 28 may be wound around cylinder 74 with a hand crank, or with a bit in an electric drill, or with an electric motor of sufficient torque that mates to a corresponding detent or protrusion 113 in or on and end of shaft 76. To facilitate consistent and tangle-free unwinding of rope 28 from cylinder 74, and rewinding of rope 28 onto cylinder 74, FIG. 6 depicts a mechanical level winder 114 that may be employed (for example, such as that sold under the brand, but not limited to, REMPCO, and as may be customized). Mechanical level winder 114 is a mechanical device that may be powered by the energy due to rotation of cylinder 74. Mechanical level winder 114 may be belt driven, chain driven, gear driven, or powered by another means. Mechanical level winder 114 ensures that each successive winding of rope 28 does not cross an adjacent winding on cylinder 74, during winding of rope 28. Mechanical level winder 114 also ensures a consistent unwinding of rope 28 from cylinder 74. Other braking mechanisms 95 may be implemented. The rope 28 may pass through the level winder fairlead 128. The level winder fairlead 128 may include or employ a top winder fairlead roller 130, a bottom winder fairlead roller 132, a first side winder fairlead roller 134, and a second side winder fairlead roller 136. When in use, rope 28 may contact any of top winder fairlead roller 130, bottom winder fairlead roller 132, first side winder fairlead roller 134, and/or second side winder fairlead roller 136, of level winder fairlead 128, as necessary. During rewinding, rope 28 will not be affected in terms of its strength or surface integrity due to the smooth, cylindrical surfaces of all rollers, and the ability of all rollers of level winder fairlead 128 to roll about each roller's own longitudinal axis. A level winder fairlead 128 may be attached to a level wind block 116. A level wind block 116 travels along the length of level wind bar 118 via guide grooves 138 in the level wind bar 118 as the level wind bar 118 rotates about its longitudinal axis.

Figure 7:
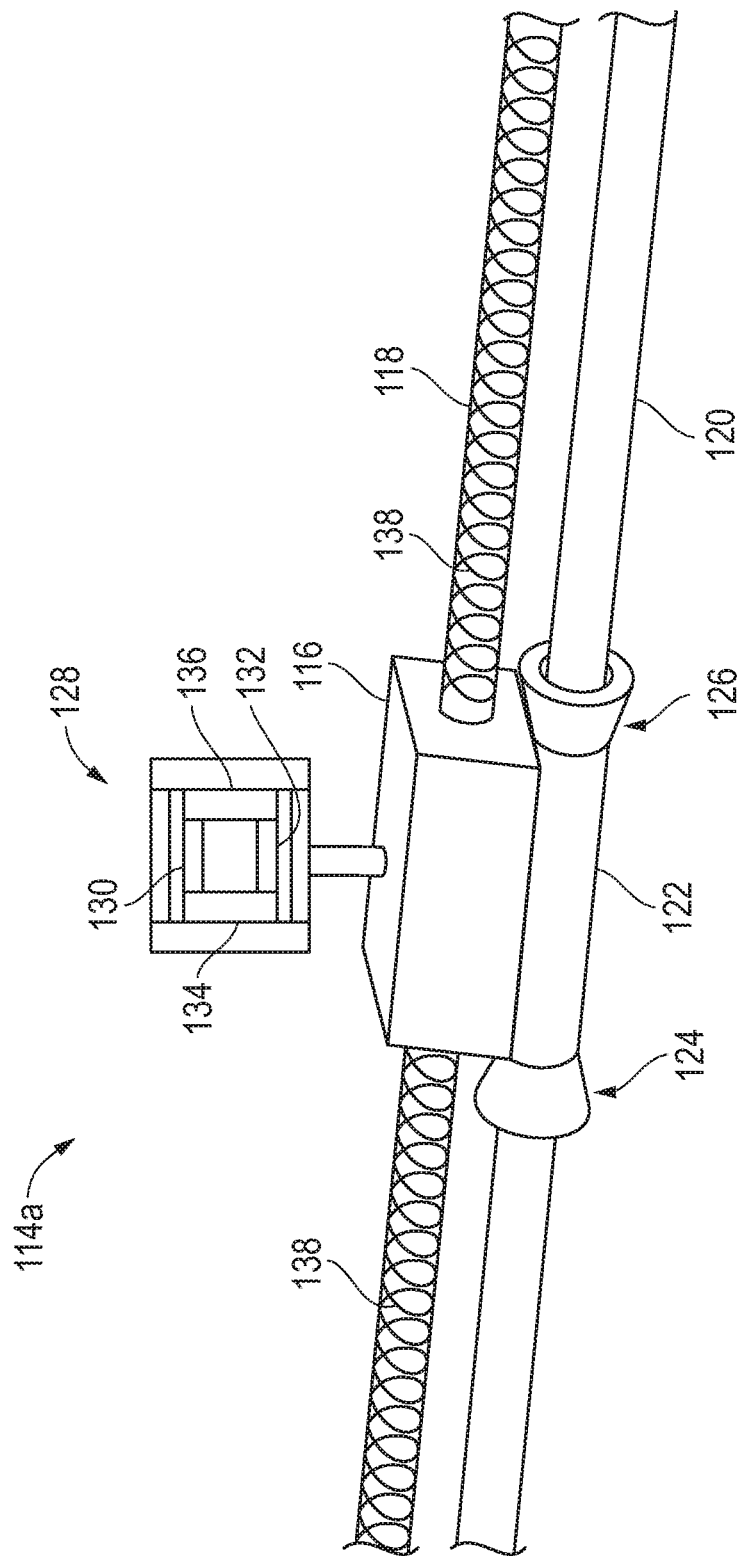
FIG. 7 is a perspective schematic view of a portion of an embodiment of a mechanical level winder.

FIG. 7 depicts a schematic of a portion of another embodiment of a mechanical level winder 114*a* that may be employed. When rewinding, rope 28 (not shown) may pass through the level winder fairlead 128. The level winder fairlead 128 may include or employ a top winder fairlead roller 130, a bottom winder fairlead roller 132, a first side winder fairlead roller 134, and a second side winder fairlead roller 136. When in use, rope 28 (not shown) may contact any of top winder fairlead roller 130, bottom winder fairlead roller 132, first side winder fairlead roller 134, and/or second side winder fairlead roller 136, of level winder fairlead 128, as necessary. During rewinding, rope 28 will not be affected in terms of its strength or surface integrity due to the smooth, cylindrical surfaces of all rollers, and the ability of all rollers of level winder fairlead 128 to roll about each roller's own longitudinal axis. A level winder fairlead 128 may be attached to a level wind block 116. A level wind block 116 travels along the length of level wind bar 118 via guide grooves 138 in the level wind bar 118 as the level wind bar 118 rotates about its longitudinal axis. A guide tube 122 is attached, e.g. welded, laterally to the bottom of the level wind block 116. Guide tube 122 has a first flared end 124 and a second flared end 126. Guide tube 122 envelops or surrounds a portion of guide bar 120. Guide tube 122 rides along guide bar 120 which stabilizes and/or aids in prevention of potential undesired spinning of level wind block 116. The first flared end 124 and the second flared end 126 inhibit gouging of the guide tube 122.

Figure 8:
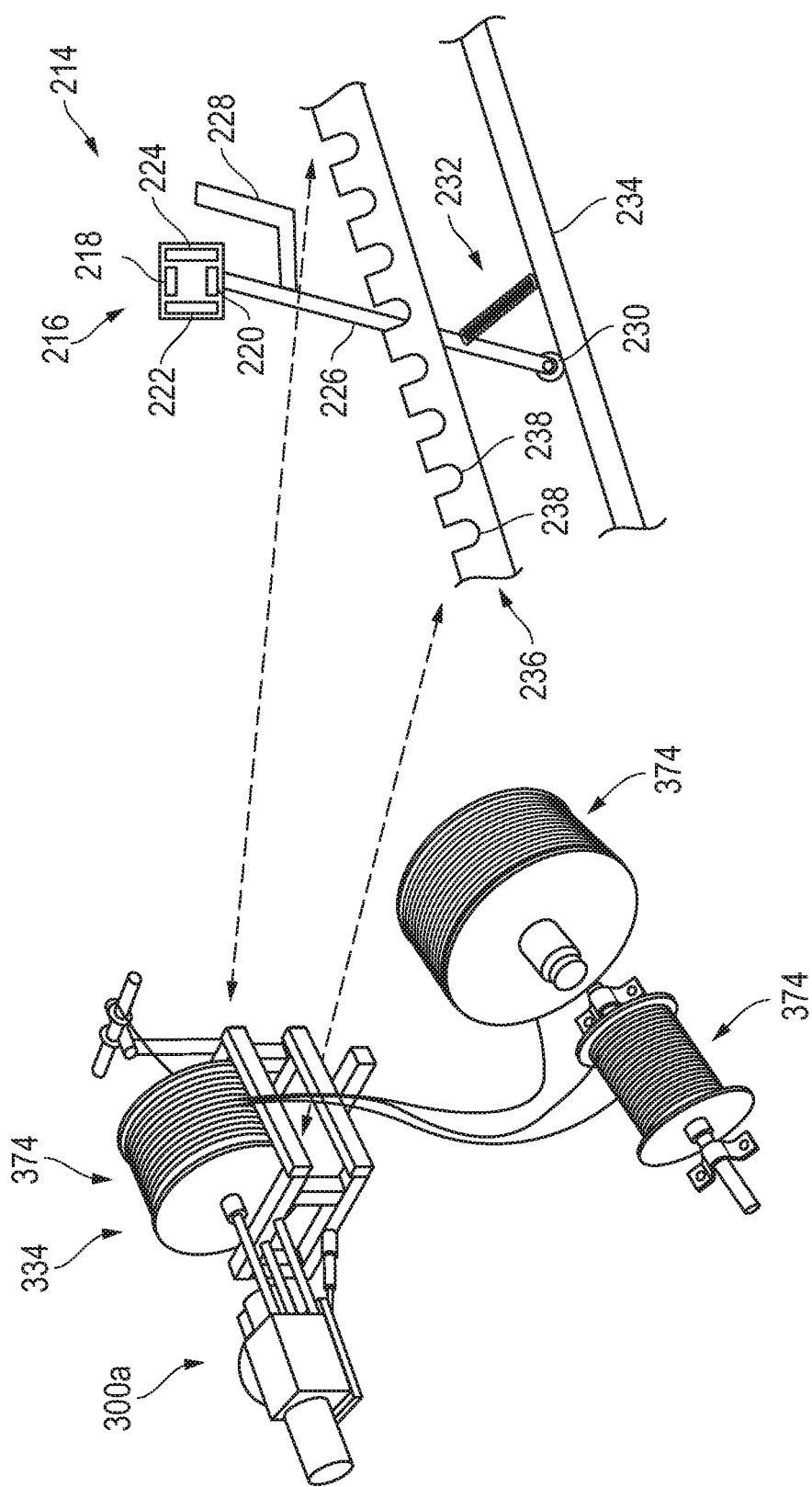
FIG. 8 is a perspective and exploded schematic view of a manual mechanical level winder with tensioning mechanism.

FIG. 8 depicts a schematic of a manual mechanical level winder 214 that may be employed as a part of another embodiment of a tensioning mechanism 334. In this embodiment of tensioning mechanism 334, motor 300*a* drives the rewinding, and a manual mechanical level winder 214 is featured in place of or as opposed to an, for example, automatic mechanical level winder 114 of FIG. 6. A manual level winder fairlead 216 of manual mechanical level winder 214 may include or employ a top manual winder fairlead roller 218, a bottom manual winder fairlead roller 220, a first side manual winder fairlead roller 222, and a second side manual winder fairlead roller 224. The manual mechanical level winder fairlead 216 is attached to a level wind arm 226. The level wind arm 226 may engage with or rest or lock in notches 238 of gauging/locking mechanism 236. The notches 238 may be ovular, elliptical, circular or other shapes. The level wind arm 226 has handle 228 and may pivot or manipulate at pivot point 230. An operator may guide the manual mechanical level winder fairlead 216 by pivoting the level wind arm 226 via the level wind handle 228. A return spring 232 connected to the level wind arm 226 and to the arm base/pivot point base/frame 234 biases to hold or lock-in-place the level wind arm 226 in a position (i.e. in a notch 238) on the gauging/locking mechanism 236 should an operator let go of handle 228 (i.e. such as if the operator desires hands-free). The arm base/frame 234 may be connected to or be integral with the frame or reel support frame of tensioning mechanism 334. An operator may timely and uniformly wind rope via skill and use or manipulation of the level wind arm 226, level wind handle 228, and gauging/locking mechanism 236 with return spring 232. Pulling rope reel or spools 374 (potentially mounted on shaft) of rope or line of varying diameters and lengths may be used as necessary (by way of example only, but not limited to a smaller diameter rope size spanning three thousand feet between structures, an intermediate diameter rope size spanning one thousand six-hundred feet between structures, and a relatively larger diameter rope size spanning one thousand feet between structures, with different sizes represented in FIG. 8).

Figure 9:
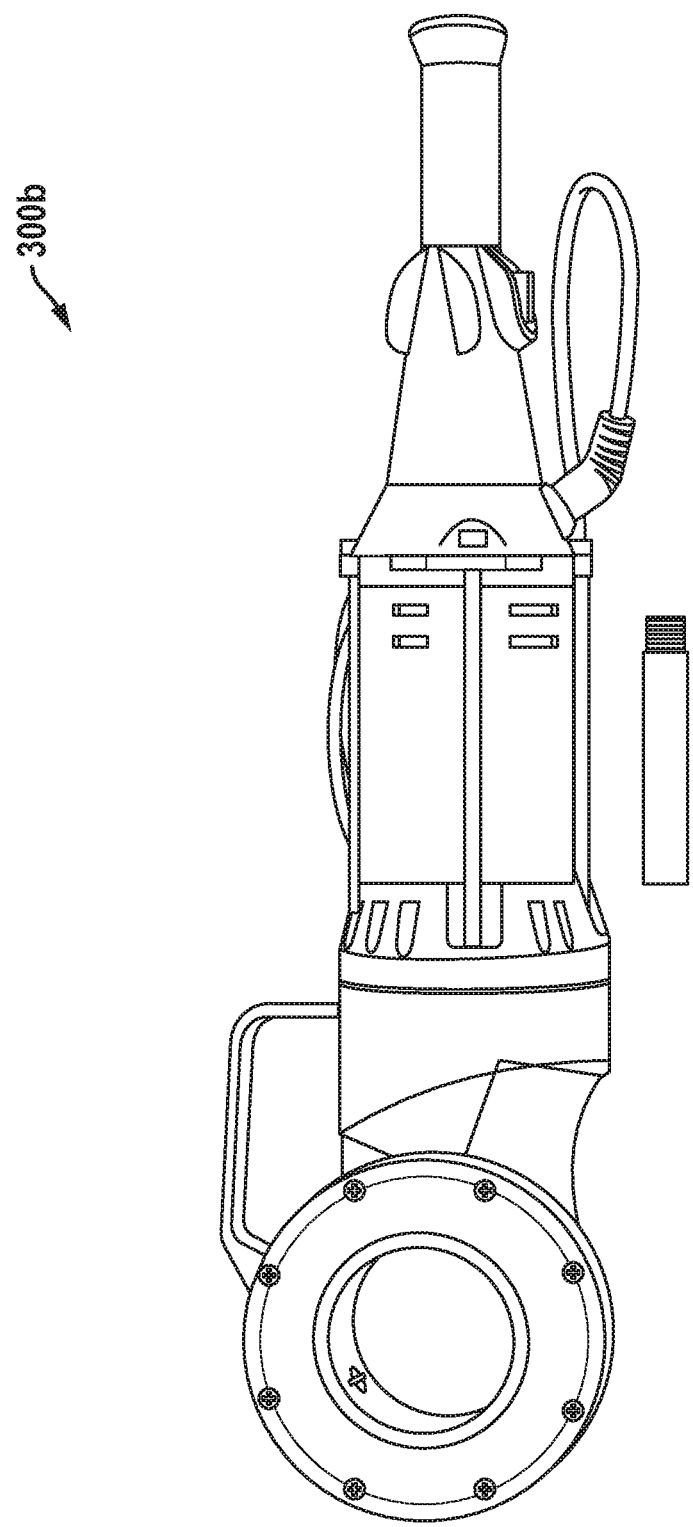
FIG. 9 is an elevation view of a pipe threader motor.

FIG. 9 is an elevation view of another embodiment of a motor in the option of a pipe threader motor 300*b* (for example, such as that sold under the brand/model, but not limited to, RIGID 700) that may be employed as an electric motor to power the rewinding and/or unwinding of rope 28 (not shown). Generally, hand crank, electric drill with a bit or socket, may be inserted into, onto or over an end of shaft 76 (shown in FIGS. 3-5) to secure a connection to shaft 76 and facilitate winding of rope 28 (shown in FIG. 6). Pipe threader motor 300*b* may connect to an end of shaft 76 (shown in FIGS. 3-5) via an adaptor (not shown). An electric motor, of which the pipe threader motor 300*b* is one example, may for example engage and drive a corresponding detent or protrusion 113 (shown in FIG. 5) in or on an end of shaft 76 (shown in FIG. 5). An electric motor, e.g. pipe threader motor 300b, may connect to either end of shaft 76 (shown in FIGS. 3-5).

A process or method of pulling a rope or flying a rope in accordance with the present teachings may include positioning vehicle 36 on a top surface of the ground or Earth and installing tensioning mechanism 34 onto vehicle 36, such as at a rear of vehicle 36 or a front of vehicle 36. Installing tensioning mechanism 34 may include inserting insertion bar 64 into a mating tow hitch 60, which is attached to vehicle 36. This will permit quickly and securely fastening tensioning mechanism 34 to vehicle 36. Attaching first end 30 of rope 28 to drone 26 can be performed either before or after starting the electric, propeller driving motors of unmanned drone 26. With propellers of drone 26 turning, and disc brake caliper 100 either completely released from disc brake rotor 96 so as not to contact disc brake rotor 96, or with disc brake caliper 100 slightly contacting disc brake rotor 96 so as to provide slight resistance to turning or spinning of cylinder 74, drone 26 may fly or lift off of the ground or other surface upon which it resides, such as a rear flat deck of a vehicle 36. With drone 26 flying in the air with rope 28 attached to drone 26, the process of pulling a rope or flying a rope is underway. With thumb lever 108 attached to cable 110, which is attached to disc brake caliper, adjusting and controlling tension in rope 28 is accomplished by moving thumb lever 108 clockwise or counterclockwise, which actuates disc brake caliper 100, which controls the friction force due to contact of disc brake caliper 100 against surfaces of disc brake rotor 96 and thereby regulates the tension force in rope 28 necessary to impart or retard spinning or rotation of cylinder 74 thereby permitting or restricting the unwinding of rope 28 when drone 26 flies away from tensioning mechanism 34.

As drone 26 flies with rope 28 attached, thumb lever 108 may be adjusted in opposite directions by a human operator to increase or decrease the rope tension and thus the resistance to flight that drone 26 experiences as it flies. Tension in rope is necessary to keep rope 28, which is attached to drone 26, from dragging on the ground and from becoming entangled in debris on the ground, which could adversely affect flight of drone 26. Tension is also necessary to permit drone to securely place or deposit rope 28 into a traveler 48, also known as a pulley, that is attached to a power line structure or tower 38, such as to an end of insulator 46, or to another structure attached to tower. The rotating traveler facilitates installation of rope 28 before a new conductor can be attached to rope 28 and pulled into place.

Continuing with the process of flying a rope, and with reference to FIG. 2, drone 26 can fly rope 28 to the end of insulator 46, such as where traveler 48 is located on power line tower 38. In one example, when ground terrain is traversable and thus ground equipment can be driven or towed into place around power lines and along a utility right-of-way, a line worker 52 in a bucket 54 at the end of boom 56 of a bucket truck can physically assist by handling and placing rope 28 securely into traveler 48, or at the same location into any device as the case may be, when drone 26 flies rope 28 to a power line location. Drone 26 and line worker 52 may then move onto another power line tower 38, such as an adjacent tower, if necessary. In another example, when ground terrain does not permit ground equipment from being put into place, such as a line worker 52 in a bucket 54 at the end of boom 56 of a bucket truck, then instead, drone 26 flying rope 28 can be flown to itself physically place rope 28 in a traveler or pulley high above the ground, such as in traveler 48 at end of insulator 46. Drone 26 may then move on to another power line tower 38, such as an adjacent tower, when the ground operator controlling the drone 26 from the ground, chooses to fly the drone 26 and rope 28 to another tower to perform the same task.

As drone 26 flies rope 28 away from tensioning mechanism 34, tension may be increased and decreased in rope 28 depending upon the line sag or droop in rope 28 as observed by a person operating thumb lever 108 of tensioning mechanism 34, or another observing bystander. When a drone operator is finished flying drone 26 to string rope 28 in travelers located on one or more power line towers 38, drone 26 may then land on the surface of the Earth or in rear of vehicle 36, and rope 28 may be connected to a larger rope or steel cable to continue with the conductor installation, by pulling the steel cable through the travelers and eventually connecting the steel cable to a new electrical conductor and pulling the electrical conductor into place on power line towers. In the event that rope 28 needs to be rewound onto cylinder 74, a hand crank may be turned to rewind rope 28, or an electric drill may be used to speed the rope rewinding process. Hand crank, electric drill with a bit or socket, may be inserted into, onto or over an end of shaft 76 to secure a connection to shaft 76 and facilitate rewinding of rope 28.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A system for controlling tension in a rope having a first end and a second end, the system comprising:
   an apparatus comprising:
      a pulling rope reel including a cylinder around which the rope is wound about the first end of the rope;
      a shaft that longitudinally connects to the pulling rope reel;
      a braking mechanism mounted proximate the pulling rope reel configured for controlling tension in the rope and aiding unwinding and rewinding the rope;
      a protruding hitch portion that protrudes from the frame;
      a plurality of holes defined along a length of the protruding hitch portion;
      wherein the pulling rope reel, the shaft, and the braking mechanism are mounted upon the frame; and wherein the pulling rope reel, the shaft, and the braking mechanism on the frame together are a handheld portable unit;

a first journal bearing and a second journal bearing mounted upon the frame, wherein each end of the shaft respectively passes through one of the first and second journal bearings;

a pulling rope guide through which the rope is threaded, wherein the pulling rope guide comprises a top roller, a bottom roller, a first side roller, and a second side roller;

a pulling rope guide support connected to the pulling rope guide and to the frame, wherein the pulling rope guide support is adjustable vertically and toward and away from the cylinder; and a hinge configured to adjust the pulling rope guide support;

an unmanned aerial device connected to the second end of the rope, wherein the unmanned aerial device flies above a surface of the Earth; and a traveler supporting the rope between the first end and the second end of the rope.

2. The system according to claim 1, wherein said braking mechanism comprises:

a disc brake rotor that is mounted to the shaft;

a brake caliper that is mounted about a partial circumference of a periphery of the disc brake rotor; and a brake lever that is movable to control movement of the brake caliper against the disc brake rotor.

3. The system according to claim 2, further comprising:

a control cable for controlling braking of the disc brake rotor, the control cable having a control cable first end and a control cable second end, the control cable first end attached to the brake lever, and the control cable second end attached to the brake caliper.

4. The system according to claim 2, further comprising: a handlebar to which the brake lever is mounted.

5. The system according to claim 4, wherein the brake lever is operable with a human hand.

6. The system according to claim 3, wherein the brake lever is a thumb lever.

7. The system according to claim 1, wherein the traveler is removable.

8. A system for tensioning a rope having a first end and a second end, the system comprising:

an apparatus comprising:

a pulling rope reel including a cylinder around which the rope is wound about the first end of the rope;

a shaft that longitudinally connects to the pulling rope reel;

a braking mechanism mounted proximate the pulling rope reel configured for tensioning the rope and aiding unwinding and rewinding the rope;

a protruding hitch portion that is insertable to a vehicle receiver hitch;

a frame, wherein the protruding hitch portion protrudes from the frame; and wherein the pulling rope reel, the shaft and the braking mechanism on the frame together are a handheld portable unit;

a plurality of holes defined along a length of the protruding hitch portion;

a first journal bearing and a second journal bearing mounted upon the frame, wherein each end of the shaft respectively passes through one of the first and second journal bearings;

a mechanical level winder connected to the frame, wherein the mechanical level winder comprises: a level wind bar having guide grooves defined on the level wind bar, wherein the level wind bar is connected to the frame; a level wind block configured to be slidable along the level wind bar via the guide grooves; and a level winder fairlead connected on the level wind block, wherein the rope passes through the level winder fairlead; further wherein the level winder fairlead comprises a top wind winder fairlead roller, a bottom winder fairlead roller, a first side winder fairlead roller and a second side winder fairlead roller; and an electric motor connected to a detent or a protrusion on the end of the shaft configured to power the unwinding and rewinding of the rope; and an airborne unmanned aerial device, which is connected to the second end of the rope; and a traveler supporting the rope between the first end and the second end of the rope.

9. The system according to claim 8, wherein said braking mechanism comprises:

a disc brake rotor that is mounted to the shaft;

a brake caliper that is mounted about partial circumference of a periphery of the disc brake rotor; and a brake lever that is movable to control movement of the brake caliper against the disc brake rotor.

10. The system according to claim 9, further comprising:

a control cable having a control cable first end attached to the brake lever, and a control cable second end attached to the brake caliper.

11. The system according to claim 10, wherein the brake lever is a thumb lever.

12. The system according to claim 10, further comprising a handlebar to which the brake lever is mounted.

13. The system according to claim 8, wherein the traveler is removable.

* * * * *